United States Patent
Kim et al.

(10) Patent No.: US 10,823,116 B2
(45) Date of Patent: Nov. 3, 2020

(54) THRUST CONTROL APPARATUS OF PROPULSION SYSTEM

(71) Applicant: AGENCY FOR DEFENSE DEVELOPMENT, Daejeon (KR)

(72) Inventors: Jeong-Jin Kim, Daejeon (KR); Seok-Jin Oh, Daejeon (KR); Jun-Young Heo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 15 days.

(21) Appl. No.: 16/387,707

(22) Filed: Apr. 18, 2019

(65) Prior Publication Data

US 2020/0080517 A1    Mar. 12, 2020

(30) Foreign Application Priority Data

Sep. 11, 2018   (KR) .................. 10-2018-0108205

(51) Int. Cl.
| | |
|---|---|
| *F02K 9/80* | (2006.01) |
| *F02K 7/08* | (2006.01) |
| *F02K 9/84* | (2006.01) |
| *F02K 9/86* | (2006.01) |
| *F02K 9/97* | (2006.01) |

(52) U.S. Cl.
CPC ............. *F02K 9/80* (2013.01); *F02K 7/08* (2013.01); *F02K 9/805* (2013.01); *F02K 9/84* (2013.01); *F02K 9/86* (2013.01); *F02K 9/97* (2013.01)

(58) Field of Classification Search
CPC ...... F02K 9/97; F02K 9/84; F02K 9/86; F02K 9/976
See application file for complete search history.

(56) References Cited

U.S. PATENT DOCUMENTS

| | | | | |
|---|---|---|---|---|
| 3,142,153 A | * | 7/1964 | Hensley ................ | F02K 9/84 239/265.35 |
| 3,192,714 A | * | 7/1965 | Hickerson ............. | F02K 9/90 60/230 |
| 3,451,625 A | * | 6/1969 | Fruktaw ................ | F02K 9/84 239/265.35 |
| 3,726,480 A | * | 4/1973 | Miltenberger ......... | F02K 9/84 239/265.19 |
| 3,727,843 A | * | 4/1973 | Parilla .................... | F02K 9/86 239/265.35 |
| 3,948,042 A | * | 4/1976 | Beardsley ............. | F02K 9/86 60/242 |
| 3,989,191 A | * | 11/1976 | McCullough ......... | F02K 9/86 239/265.15 |

(Continued)

FOREIGN PATENT DOCUMENTS

| | | |
|---|---|---|
| JP | 2002-227723 A | 8/2002 |
| KR | 10-2005-0078695 A | 8/2005 |
| KR | 10-1440453 B1 | 9/2014 |

*Primary Examiner* — Todd E Manahan
*Assistant Examiner* — Kyle Robert Thomas
(74) *Attorney, Agent, or Firm* — LRK Patent Law Firm

(57) ABSTRACT

The proposed technology relates to a thrust control apparatus of a propulsion system, and more particularly, to a thrust control apparatus of a solid propulsion system equipped with an aerospike pintle nozzle. The present invention is to simultaneously control the magnitude and direction of thrust by installing a pintle and a thrust vectoring unit at the rear end of a combustion tube of a solid propulsion system.

11 Claims, 3 Drawing Sheets

(56) References Cited

U.S. PATENT DOCUMENTS

| | | | | |
|---|---|---|---|---|
| 4,157,788 A | * | 6/1979 | Canfield | F02K 9/84 239/265.35 |
| 7,155,898 B2 | * | 1/2007 | Sota, Jr. | F02K 9/86 239/265.19 |
| 7,565,797 B2 | * | 7/2009 | Nyberg | F02K 9/08 60/253 |
| 2005/0178878 A1 | | 8/2005 | Kim et al. | |

* cited by examiner

THRUST CONTROL APPARATUS OF PROPULSION SYSTEM

CROSS REFERENCE TO RELATED APPLICATION(S)

This application claims the benefit of Korean Patent Application No. 10-2018-0108205, filed on Sep. 11, 2018, which is hereby incorporated by reference in its entirety into this application.

BACKGROUND OF THE INVENTION

1. Technical Field

The proposed technology relates to a thrust control apparatus of a propulsion system, and more particularly, to a thrust control apparatus of a solid propulsion system equipped with an aerospike pintle nozzle.

2. Description of the Related Art

In general, guided weapons use contraction-diffusion nozzles as devices that change thermal energy of high-temperature high-pressure gas into kinetic energy, and such contraction-diffusion nozzles differ in performance, depending on a back pressure change according to the altitude.

Accordingly, aerospike nozzles that use external air as a nozzle wall and can achieve relatively uniform efficiency regardless of the altitude, unlike existing nozzles, have been studied and developed at home and abroad.

Meanwhile, it is required to control the magnitude of thrust in accordance with periods and control the direction of thrust for smooth guidance due to the characteristics of guided weapons that are used for military purposes.

In liquid propulsion systems using aerospike nozzles, it is possible to easily control the magnitude and direction of thrust by adjusting all or only one of the flow rates of injectors that are equivalent from the early stage.

However, solid propulsion systems, which are used for most of military guided weapons, require an additional apparatus for controlling the magnitude and direction of thrust unlike liquid propulsion systems.

SUMMARY OF THE INVENTION

The present invention has been made in an effort to solve the problems described above and an object of the present invention is to simultaneously control the magnitude and direction of thrust by installing a pintle and a thrust vectoring unit at the rear end of a combustion tube of a solid propulsion system.

In order to achieve the objects of the present invention, a thrust control apparatus of a propulsion system includes: an aerospike pintle nozzle extending from a combustion tube in which a propellant grain is burned; a pintle disposed in the aerospike pintle nozzle; a driving motor disposed on an inner side of the aerospike pintle nozzle and moving the pintle toward a front end and a rear end of the combustion tube; a thrust vectoring unit disposed at a rear end of the aerospike pintle nozzle; and a cylinder moving and rotating the thrust vectoring unit; and
the thrust vectoring unit may have: a ring-shaped sliding part having an outer side being in contact with an inner wall of the aerospike pintle nozzle; and a rotational part extending a predetermined length outside the combustion tube from a rear end of the sliding part.

The magnitude and the direction of thrust of the propulsion system may be simultaneously controlled.

An end of the rotational part may function as a nozzle neck.

The direction of thrust may be controlled by movement and rotation of the thrust vectoring unit.

The outer side of the sliding part may be curved at the same angle as the inner wall of the aerospike pintle nozzle.

A first end of the cylinder may be fixed to an end of the rotational part.

The sliding part may slide on the inner wall of the aerospike pintle nozzle forward and rearward along a central axis of the combustion tube by contracting and expanding of the cylinder.

When the cylinder contracts, the sliding part may move toward the front end of the combustion tube.

When the cylinder expands, the sliding part may move toward the rear end of the combustion tube.

The rotational part may move in the same direction as the sliding part by contracting and expanding of the cylinder.

The rotational part may be rotated close to or away from an outer side of the pintle by the sliding part moving along a curve of the combustion tube.

When the cylinder contracts, the rotational part may be rotated away from the outer side of the pintle.

As the rotational part moves away from the outer side of the pintle, a nozzle neck gap that is a gap between an end of a corresponding curved portion of the thrust vectoring unit and the pintle may gradually widen.

As the nozzle neck gap widens, thrust at a portion where the end of the curved portion of the thrust vectoring unit and the pintle are positioned may increase.

When the cylinder expands, the rotational part may be rotated close to the outer side of the pintle.

As the rotational part moves close to the outer side of the pintle, a nozzle neck gap that is a gap between an end of a corresponding curved portion of the thrust vectoring unit and the pintle may gradually narrow.

As the nozzle neck gap narrows, thrust at a portion where the end of the curved portion of the thrust vectoring unit and the pintle are positioned may decrease.

A rail that guides movement of the sliding part may be disposed on the inner wall of the aerospike pintle nozzle.

A purging mode that prevents deposition of particles on a curved portion of the sliding part by operating the thrust vectoring unit and the driving motor may be performed.

The purging mode may be performed before the propulsion system performs re-ignition after initial ignition.

According to the present invention, it is possible to simultaneously control the magnitude and direction of thrust.

Further, it is possible to secure a wider space for a propellant grain in the combustion tube by installing the apparatus for controlling the direction of thrust outside a combustion tube and installing only the apparatus for controlling the magnitude of thrust inside the combustion tube, so it is possible to relatively reduce the load in heat resistance design.

Further, the structure is simple, so the weight can be reduced.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
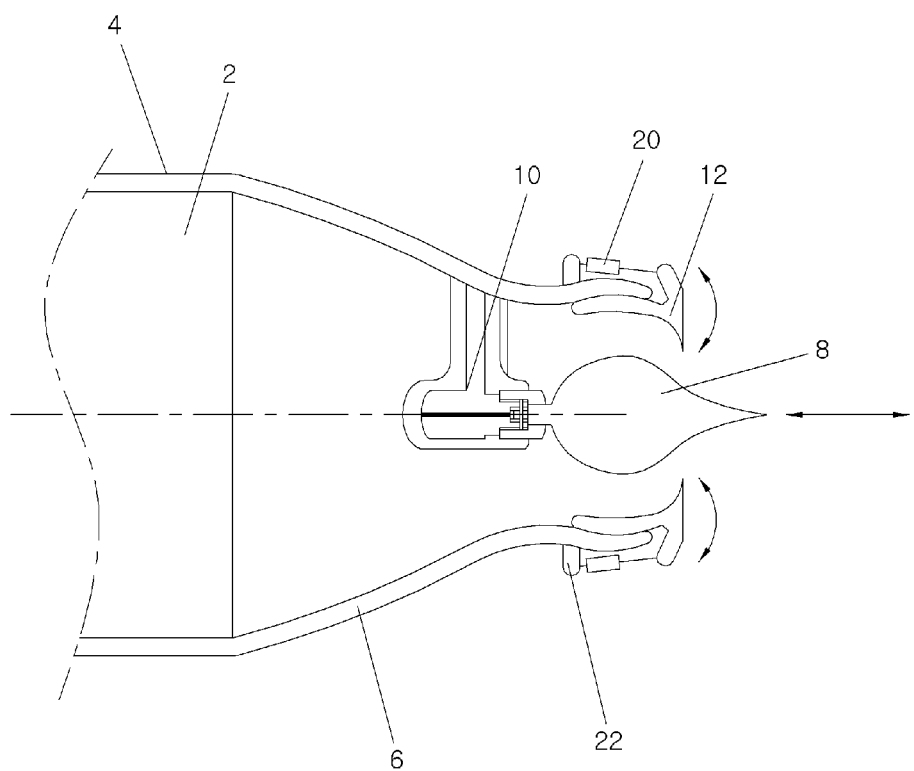
FIG. 1 is a cross-sectional view of a thrust control apparatus according to the present invention.

The features and advantages of the present invention described above will be clearer through the following detailed description relating to the accompanying drawing, so the spirit of the present invention would be easily implemented by those skilled in the art. The present invention may be modified in various ways and implemented by various exemplary embodiments, so that specific exemplary embodiments are shown in the drawings and will be described in detail herein. However, it is to be understood that the present invention is not limited to the specific exemplary embodiments, but includes all modifications, equivalents, and substitutions included in the spirit and the scope of the present invention. Terms used in the present specification are used only in order to describe specific exemplary embodiments rather than to limit the present invention.

Hereinafter, exemplary embodiments of the present invention are described in detail with reference to the accompanying drawings.

The present invention relates to a thrust control apparatus of a propulsion system, and more particularly, to a thrust control apparatus of a solid propulsion system equipped with an aerospike pintle nozzle.

FIG. 1 is a cross-sectional view of a thrust control apparatus according to the present invention.

A thrust control apparatus of the present invention includes: an aerospike pintle nozzle 6 extending from a combustion tube 4 in which a propellant grain 2 is burned; a pintle 8 disposed in the aerospike pintle nozzle 6; a driving motor 10 disposed on the inner side of the aerospike pintle nozzle 6 and moving the pintle 8 toward the front end and the rear end of the combustion tube 4; a thrust vectoring unit 12 disposed at the rear end of the aerospike pintle nozzle 6; and a cylinder 20 moving and rotating the thrust vectoring unit 12.

Figure 2:
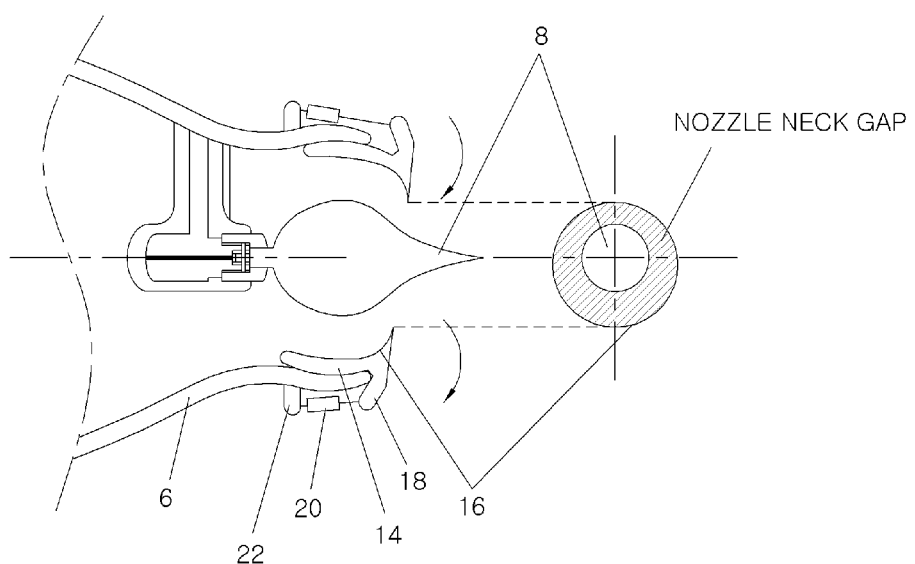
FIG. 2 is a conceptual view when a thrust direction is controlled by the thrust control apparatus according to the present invention.

FIG. 2 is a conceptual view when a thrust direction is controlled by the thrust control apparatus according to the present invention.

The thrust vectoring unit 12 includes a ring-shaped sliding part 14 having an outer side being in contact with the inner wall of the aerospike pintle nozzle 6 and a rotational part 18 extending a predetermined length outside the combustion tube 4 from the rear end of the sliding part 14.

The outer side of the sliding part 14 is curved at the same angle as the inner wall of the aerospike pintle nozzle 6 to be positioned in close contact with the aerospike pintle nozzle 6.

The inner curved line of the sliding part 14 is formed in a pointed cross-section from a predetermined portion of the sliding part 14 to come close to the pintle 8 as it goes to the rear end of the sliding part 14, so a curved portion 16 is formed at the rear end of the inner side of the sliding part 14.

A nozzle neck is formed at the rear end of the combustion tube 4 due to the shape of the curved portion 16, whereby the generation position of a shock wave can be stably maintained.

The end of the curved portion 16 formed at the rear end of the sliding part 14 functions as the nozzle neck of the aerospike pintle nozzle 6.

The rotational part 18 extends a predetermined length outside the combustion tube 4 from the rear end of the sliding part 14, bends a predetermined angle toward the front end of the combustion tube 4, and then extends a predetermined length.

A cylinder holder 22 is formed on the outer wall of the aerospike pintle nozzle 6. A second end of the cylinder 20 is fixed to the cylinder holder 22 and a first end of the cylinder 20 is fixed to the end of the rotational part 18.

The thrust vectoring unit 12 controls the direction of thrust while being moved and rotated by the cylinder 20, and when the cylinder 20 fully contracts, the end of the aerospike nozzle 6 is positioned between the outer side of the sliding part 14 and the rotational part 18.

The sliding part 14 slides on the inner wall of the aerospike pintle nozzle 6 forward and rearward along the central axis of the combustion tube 4 by contracting and expanding of the cylinder 20.

When the cylinder 20 contracts, the sliding part 14 moves toward the front end of the combustion tube 4, and when the cylinder 20 expands, the sliding part 14 moves toward the rear end of the combustion tube 4.

The rotational part 18 is moved in the same direction as the sliding part 14 by contracting and expanding of the cylinder 20.

The rotational part 18 is rotated close to or away from the outer side of the pintle 8 by the sliding part 14 moving along the curve of the combustion tube 3. The inner wall of the combustion tube 4 has a curve having a predetermined angle, and when the sliding part 14 moves along the curve of the inner wall of the combustion tube 4, the rotational part 18 is rotated by the curve of the inner wall of the combustion tube 4.

A rail (not shown) is disposed on the inner wall of the combustion tube 4 of the aerospike pintle nozzle 6, thereby guiding movement of the sliding part 18.

According to an embodiment, the rotational part 18 and the sliding part 14 may be hingedly connected to each other.

In this case, the sliding part 14 is fixed to the inner wall of the aerospike pintle nozzle 6, so it does not move regardless of contracting and expanding of the cylinder 20, but the rotational part 18 is hingedly rotated about the sliding part 14 by contracting and expanding of the cylinder 20.

When the cylinder contracts 20, the rotational part 18 hingedly rotates away from the outer side of the pintle 9 from the existing position, and when the cylinder 20 expands, the rotational part 18 hingedly rotates close to the outer side of the pintle 8 from the existing position.

A plurality of cylinders 20 that moves the thrust vectoring unit 12 is arranged at predetermined angles around the aerospike pintle nozzle 6.

When any one of the cylinders 20 has fully contracted, another cylinder 20 opposite the any one cylinder 20 has fully expanded, that is, any one of two cylinders opposite each other contracts as much as the other one expands.

When the sliding part 14 moves toward the front end of the combustion tube 4, the rotational part 18 is pulled toward the front end of the combustion tube 4 by the cylinders 20 and rotated away from the outer side of the pintle 8. As the rotational part 18 moves away from the outer side of the pintle 8, the curved portion 16 also moves away from the outer side of the pintle 8, so a nozzle neck gap that is the gap between the end of the curved portion 16 and the pintle 8 gradually widens. Further, as the nozzle neck gap widens, thrust at the portion where the end of the curved portion 16 and the pintle 8 are positioned increases.

When the sliding part 14 moves toward the rear end of the combustion tube 4, the rotational part 18 is pushed toward the rear end of the combustion tube 4 by the cylinders 20 and rotated close to the outer side of the pintle 8. As the rotational part 18 moves close to the outer side of the pintle 8, the curved portion 16 also moves close to the outer side of the pintle 8, so a nozzle neck gap that is the gap between the end of the curved portion 16 and the pintle 8 gradually narrows. Further, as the nozzle neck gap narrows, thrust at the portion where the end of the curved portion 16 and the pintle 8 are positioned decreases.

That is, when the nozzle neck gap that is the gap between the end of the curved portion 16 and the pintle 8 at a portion, which is fixed to any one of the cylinders 20, of the thrust vectoring unit 12 is minimum, the nozzle neck gap that is the gap between the end of the curved portion 16 and the pintle 8 at a portion, which is fixed to another cylinder 20 opposite the any one cylinder 20, of the thrust vectoring unit 12 is maximum.

Accordingly, the thrust of the propulsion system decreases at the portion where the nozzle neck gap decreases from the initial state and the thrust of the propulsion system increases at the portion where a nozzle neck gap increases from the initial state by movement and rotation of the thrust vectoring unit 12 due to expanding and contracting of the cylinders 20, around the aerospike pintle nozzle 6.

When the nozzle neck gap is different around the aerospike pintle nozzle 6 due to movement and rotation of the thrust vectoring unit 12, there is no change in the nozzle neck area itself, so there is little change in pressure in the combustion tube 4.

However, the flow rate of combustion gas that is discharged at the portion where the nozzle neck gap increases from the initial state is larger than the flow rate of combustion gas that is discharged at the portion where the nozzle neck gap decreases from the initial state, so the thrust decreases at the portion where the nozzle neck gap decreases from the initial state and increases at the portion where the nozzle neck gap increases from the initial state.

Thrust vectoring is generated by the asymmetry of thrust around the aerospike pintle nozzle 6, so it is possible to control the direction of thrust.

The pintle 8 has a circular cross-section, so the nozzle neck gap linearly increases from the portion where the nozzle neck gap is minimum to the portion where the nozzle neck gap is maximum around the pintle 8, and accordingly, the thrust also linearly changes.

The thrust control apparatus for controlling the magnitude of thrust is described hereafter.

The pintle 8 is coaxially installed on the central axis of the combustion tube 4 and is moved toward the front end and rear end of the combustion tube 4 by the driving motor 10.

The magnitude of thrust is controlled by movement of the pintle 8.

The nozzle neck gap that is the gap between the pintle 8 and the curved portion 16 is narrowed or widened by movement of the pintle 8. That is, as the pintle 8 is moved toward the rear end of the combustion tube 4, the nozzle neck gap of the aerospike pintle nozzle 6 narrows, and as the pintle 8 moves toward the front end of the combustion tube 4, the nozzle neck gap of the aerospike pintle nozzle 6 widens.

When the nozzle neck gap is changed by movement of the pintle 8, the nozzle neck gap is uniformly changed throughout the circumference of the aerospike pintle nozzle 6.

Accordingly, as the pintle 8 moves toward the rear end of the combustion tube 4, the nozzle neck area that is the area between the pintle 8 and the end of the curved portion 16 decreases, and as the pintle 8 moves toward the front end of the combustion tube 4, the nozzle neck area increases.

When the pintle 8 moves toward the rear end of the combustion tube 4 and the nozzle neck area of the aerospike pintle nozzle 6 decreases, combustion gas is discharged less than the previously discharged combustion gas, so the internal pressure of the combustion tube 4 is increased by the non-discharged combustion gas, whereby thrust of the propulsion system increases.

When the pintle 8 moves toward the front end of the combustion tube 4 and the nozzle neck area of the aerospike pintle nozzle 6 increases, combustion gas is discharged much more than the previously discharged combustion gas, so the internal pressure of the combustion tube 4 is decreased, whereby thrust of the propulsion system decreases.

That is, as the pintle 8 moves, the nozzle neck area changes, thereby controlling the magnitude of thrust.

According to the configuration described above, the thrust control apparatus of the present invention can simultaneously control the direction and magnitude of thrust.

Figure 3:
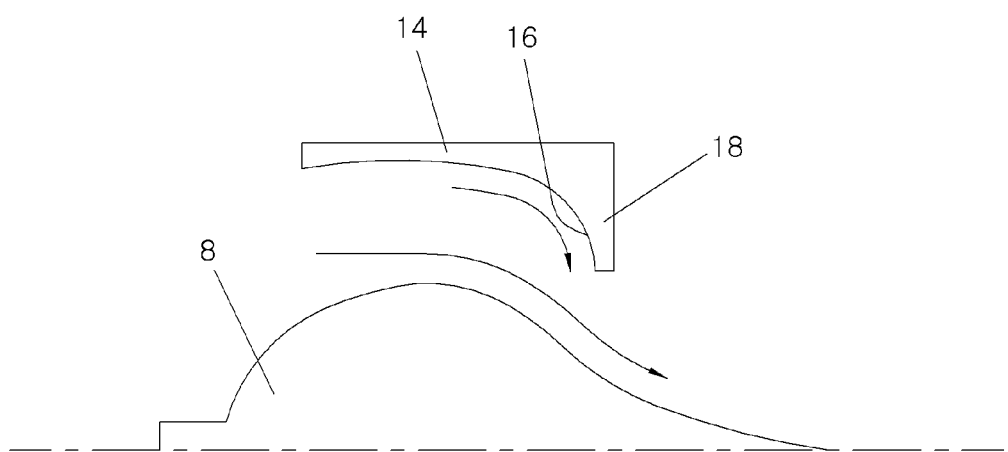
FIG. 3 is a view showing the structure of an inner wall surface of a thrust vectoring unit according to the present invention.

FIG. 3 shows the structure of an inner wall surface of a thrust vectoring unit according to the present invention.

A multi-pulse propulsion system is a technology that can increase the range and improve the terminal speed of guided missiles by efficiently distributing energy of a propulsion system by supplementing a one-shot propulsion generation type of existing solid propulsion systems.

According to the multi-pulse propulsion system, aluminum particles are generated by a propellant grain at the initial ignition and are deposited on the curved portion 16 of the thrust vectoring unit 12, which causes a problem when the propulsion system generates thrust.

In order to solve this problem, a purging mode that prevents deposition of particles on the curved portion 16 by operating the thrust vectoring unit 12 and the driving motor 10 is performed in the present invention.

The purging mode is performed before a propulsion system performs re-ignition after initial ignition. Combustion gas is not produced between the initial ignition and re-ignition of a propulsion system, so it is possible to operate the thrust vectoring unit 12 and the driving motor 10 without influencing the orbit of the propulsion system, that is, the magnitude and direction changes of thrust.

Accordingly, the purging mode is performed by inertia that is generated by moving the driving motor 10 fastest toward the front end and the rear end of the combustion tube 4 or rotating fastest the thrust vectoring unit without overloading the entire configuration of the propulsion system, whereby it is possible to prevent deposition of aluminum particles etc. produced during the initial ignition periods.

By operating the purging mode, it is possible to increase stability and efficiency of guided missiles when during operation after re-ignition of the multi-pulse propulsion system.

Although exemplary embodiments of the present invention were described above, it should be understood that the present invention may be changed and modified in various ways by those skilled in the art without departing from the spirit and scope of the present invention described in the following claims.

What is claimed is:

1. A thrust control apparatus for controlling magnitude and direction of thrust of a propulsion system, the thrust control apparatus comprising:
   an aerospike pintle nozzle extending from a combustion tube in which a propellant grain is burned;
   a pintle disposed in the aerospike pintle nozzle;
   a driving motor disposed on an inner side of the aerospike pintle nozzle and moving the pintle toward a front end and a rear end of the combustion tube;
   a thrust vectoring unit disposed at a rear end of the aerospike pintle nozzle;
   a cylinder moving and rotating the thrust vectoring unit; and wherein the thrust vectoring unit has:
   a ring-shaped sliding part having an outer side being in contact with an inner wall of the aerospike pintle nozzle; and
   a rotational part extending a predetermined length outside the combustion tube from a rear end of the sliding part,
   wherein a first end of the cylinder is fixed to an end of the rotational part,
   wherein the magnitude and the direction of thrust of the propulsion system are simultaneously controlled by moving the pintle and the rotational part, and curvature is formed at an inner end of the sliding part,
   wherein a curved outer side of the sliding part is curved at the same angle as the inner wall of the aerospike pintle nozzle such that the sliding part slides on the inner wall of the aerospike pintle nozzle forward and rearward along a central axis of the combustion tube by contracting and expanding the cylinder and the rotational part moves in the same direction as the sliding part by contracting and expanding of the cylinder,
   wherein a curved inner side of the sliding part ends with a pointed portion which comes close to the pintle,
   wherein the rotational part is rotated close to or away from an outer side of the pintle by the sliding part moving along a curve of the aerospike pintle nozzle.

2. The thrust control apparatus of claim 1, wherein an end of the rotational part functions as a nozzle neck.

3. The thrust control apparatus of claim 1, wherein the direction of thrust is controlled by movement and rotation of the thrust vectoring unit.

4. The thrust control apparatus of claim 1, wherein when the cylinder contracts, the sliding part moves toward the front end of the combustion tube.

5. The thrust control apparatus of claim 1, wherein when the cylinder expands, the sliding part moves toward the rear end of the combustion tube.

6. The thrust control apparatus of claim 1, wherein when the cylinder contracts, a portion of the rotation part is rotated away from the outer side of the pintle.

7. The thrust control apparatus of claim 6, wherein the portion of the rotational part moves away from the outer side of the pintle, a nozzle neck gap that is a gap between an end of a corresponding curved portion of the thrust vectoring unit acid the pintle gradually widens.

8. The thrust control apparatus of claim 7, wherein as the nozzle neck gap widens, thrust at a position where the end of the curved portion of the thrust vectoring unit and the pintle are positioned increases.

9. The thrust control apparatus of claim 1, wherein when the cylinder expands, a portion of the rotational part is rotated close to the outer side of the pintle.

10. The thrust control apparatus of claim 9, wherein as the portion of the rotational part moves close to the outer side of the pintle, a nozzle neck gap that is a gap between an end of a corresponding curved portion of the thrust vectoring unit and the pintle gradually narrows.

11. The thrust control apparatus of claim 10, wherein as the nozzle neck gap narrows, thrust at a portion where the end of the curved portion of the thrust vectoring unit and the pintle are positioned decreases.

* * * * *